3,329,729
PRODUCTION OF MANNITOL AND SORBITOL BY HYDROGENATING SUGARS UNDER NEUTRAL, THEN ALKALINE AND FINALLY ACIDIC CONDITIONS
John D. Brandner and Leon W. Wright, Wilmington, Del., assignors to Atlas Chemical Industries, Inc., Wilmington, Del., a corporation of Delaware
No Drawing. Filed Dec. 31, 1962, Ser. No. 248,258
3 Claims. (Cl. 260—635)

The present invention relates to a method of producing mannitol and sorbitol and, more particularly, to a method of hydrogenating an aqueous mixture of glucose and fructose to produce a mixture of mannitol and sorbitol. The process of the present invention is especially useful in that it may be employed to produce a mixture of mannitol and sorbitol which is essentially free of related polyhydric materials and which contains a higher than expected weight ratio of mannitol.

The prior art has established that when glucose is catalytically hydrogenated in an essentially neutral solution and under mild conditions of temperature and pressure, the product of the reduction is sorbitol of high purity; and when fructose is hydrogenated under similar conditions, the product of the reduction is a mixture of sorbitol and mannitol in essentially equal proportions, and free from related polyhydric materials. The prior art has likewise established that as the conditions of hydrogenation depart from neutrality, either on the alkaline or on the acid side, and as the temperature and/or pressure becomes excessively high, reactions other than hydrogenation occur simultaneously therewith and complex mixtures are obtained which contain reduction products and/or hydrogenolysis products of sugar isomers as well as the expected sorbitol and mannitol.

Generally, mixtures of glucose and fructose, such as may be obtained from the inversion of sucrose, are subjected to hydrogenation under near neutral conditions, the resulting product is nearly always found to be contaminated with a non-reducing sugar, which is not sucrose. The extent of such contamination is not great, usually from 0.2% to 1.0%, and it was not recognized in some of the early work, since only the reducing monosaccharides were expected and sought in analysis of the hydrogenation product. For many purposes, however, the presence of these small amounts of non-reducing sugars is very undesirable. They are fermentable, which detracts from the storage stability of solutions containing them. Generally, such sugars are thermally less stable than sorbitol and when products containing them are employed in high temperature esterification reactions, undesirably dark products result. When sorbitol containing such sugars is employed as a plasticizer for flexible glue, it exerts a slow tanning action on the gelatin and prevents proper remelting of the glue after storage.

The present process provides a means of converting reducible sugar into products containing considerably higher amounts of mannitol than are obtained by the methods currently employed in the art. The present commercial practice involves the hydrogenation of invert sugar to a mixture consisting essentially of sorbitol and mannitol (about 75% sorbitol and about 25% mannitol). The hydrogenation product is then treated to recover as much mannitol as can be recovered by crystallization. By the present invention hydrogenation products containing as much as 36% by weight of mannitol have been produced.

The present invention provides a process of producing mannitol and sorbitol from an aqueous mixture of glucose and fructose. The sugar concentration in the aqueous mixture preferably is sufficiently high that handling of large amounts of diluted feed material is avoided and yet sufficiently low that a feed material suitable for handling in subsequent processing steps is obtained. Aqueous mixtures containing less than about 20% by weight of sugar usually undesirably entail the handling of large amounts of feed material and promote the inefficient use of chemical reactants or additives because of dilution. Sugar mixtures containing more than 80% by weight sugar generally are of a thick consistency and undesirably retard flow and pouring of the process feed material. The pH of the starting mixture is initially adjusted to substantially neutral. A desirable range for the pH of the starting mixture is from about 6.0 to about 8.0. A suitable hydrogenation catalyst is suspended in the mixture and the mixture hydrogenated at a temperature between about 50 and about 80° C. until substantially all of the fructose in the mixture is converted to sorbitol and mannitol. The reaction is carried out under conditions which are not favorable to hydrogenation of any glucose which may be present. The hydrogenated mixture may then be made alkaline and hydrogenated a second time. Under these conditions glucose is isomerized and substantially all of the reducible sugars, such as fructose and mannose, thus formed are converted into mannitol and sorbitol. The resulting mixture usually containing a small amount of non-reducible sugars may suitably be recovered and utilized as a resin component or as a humectant suited to use in various types of confections, e.g. marshmallows. If a product substantially entirely free of sugars is desired, the mixture from the second hydrogenation step is made acid and subjected to a third hydrogenation. By this means, any residual non-reducible sugars (generally not more than 2% is present), are hydrolyzed and the formed reducible sugars are hydrogenated. The product produced contains more than 25% by weight of mannitol. The portion of the product which is not mannitol is almost entirely sorbitol and contains very minor amounts of non-reducing sugars and other polyhydric materials.

A suitable starting material for the present method, an aqueous saccharidic mixture containing a total of from about 25 to about 80% by weight of glucose and fructose may readily be obtained by an inversion of sucrose carried out by contacting the sucrose starting material with an acid solution.

The initial adjustment of the sugar mixture to a substantially neutral pH may be made by utilizing any suitable acid or, if required, alkaline agent. A suitable acidic agent may, for example, be inorganic acids, such as, sulfuric, hydrochloric, or phosphoric acid; inorganic acid agents, such as pottasium bisulfate; or organic acids, such as, acetic, tartaric, oxalic acid. Suitable alkaline agents, for example, may be alkali metal hydroxides such as potassium or sodium, soda ash, or an alkaline earth metal hydroxide, such as lime, for example. Preferred agents, for reasons of availability, ease of manipulation and ease of removal from the finished product by an ion exchange reaction, are sulfuric acid or lime in the form of either calcium oxide or calcium hydroxide.

Hydrogenating catalysts, for example, supported nickel and noble metal catalysts, are suited to use in the present invention. Such catalysts and their method of preparation are well known in the art. Typically, a supported nickel catalyst is prepared by precipitating nickel hydroxide, in the presence of finely divided diatomaceous earth or other suitable support, washing the resulting product to free it from soluble salts and reducing the deposited nickel hydroxide in an atmosphere of hydrogen.

In the practice of the present invention, the amount of supported catalyst should be so chosen that there is a sufficient weight of metal, calculated on the weight of sugar, to complete the hydrogenation in a reasonable length of time, but an insufficient weight of metal to promote hydrogenation at a rate that exceeds the rate of isomerization in the second hydrogenation step of the present process. In regard to nickel, as little as about 0.3% may be sufficient, and amounts above about 2.0% usually promote a hydrogenation rate that is undesirably rapid.

Within the foregoing range of proportion, the amount of catalyst to be utilized in the present invention will depend upon various conditions, among which are the composition of the reaction mixture, reaction temperature, reaction pressure and catalyst activity. Other conditions being equal the catalyst activity will determine the rate of the hydrogenation reaction and may be expressed in terms of the rate constant of the hydrogenation reaction when the catalyst is employed under defined conditions. In catalytic sugar hydrogenations, at fixed conditions of temperature, pressure, catalyst concentrations and initial sugar concentrations, the relation is pseudo first order. The relation between the initial sugar concentrations, $C_o$, and the sugar concentration, $C$, after elapsed time, $t$, of reaction is given by the well-known first-order reaction equation:

$$\log \frac{C_o}{C} = kt$$

wherein $k$ is the reaction rate constant and its value is fixed by the units chosen for expressing the reaction conditions and by the activity of the catalyst. For purposes of this application, the values recited as catalyst activities are 1000 times the numerical value of the rate constants, in reciprocal minutes, obtained in the hydrogenation of glucose in essentially neutral, 70 percent by weight aqueous solution at 80° C. and under a pressure of 1500 p.s.i., with sufficient nickel catalyst to furnish 0.75% by weight of nickel based on the weight of glucose. Catalysts suited to use in the present invention should be sufficiently active to catalyze the reaction within a reasonable length of time. Generally amounts of catalysts having a concentration-activity product (concentration in terms of the weight percent of metal based on the weight of the sugar starting material multiplied by the catalyst activity value calculated as explained in the foregoing) of from about 0.9 to about 6.0 promote the present hydrogenation reactions at a reasonable rate.

The initial step of the present process is a hydrogenation carried out under substantially neutral conditions, preferably conducted at a temperature of from about 50 to about 80° C., under a hydrogen pressure of between about 500 and about 3000 p.s.i.g., and for a time of between about 0.25 and about 2.0 hrs.

The second step of the present process is a hydrogenation carried out under alkaline conditions. The alkaline condition suited to carry out the present invention is sufficient to catalyze the isomerization of glucose which in turn yields additional mannitol and sorbitol. Generally the mixture from the initial hydrogenation is treated with an alkaline agent until a pH measured at ambient conditions of over about 8.0 is obtained. At a pH of 8.0 or less, the alkalinity of the mixture is usually insufficient to promote a catalytic isomerization of glucose under hydrogenation conditions at a practical rate. A pH of over about 11.0 is usually to be avoided as undesirable degradation of the feed material may be encountered. Although alkaline agents such as sodium and potassium hydroxides may be used, it is preferred because of ease of handling and ease of removal to utilize lime as the alkaline agent. Lime may suitably be introduced into the reaction in the form of calcium oxide or calcium hydroxide. The presence of lime in small amounts, has been found to promote the formation of mannitol by increasing the rate of isomerization of glucose to fructose which occurs in the reaction solution. However, a surplus of lime is also to be avoided as degradation of the feed and resultant drop of mannitol production occurs if too much lime is used.

Based on the weight of sugar a suitable proportion of lime, calculated as calcium oxide, should be not less than about 0.25%, or more than about 1.5%. If desired, a small amount of calcium carbonate, generally between about 0.02 and 0.08% based on the weight of sugar, may be added along with the lime as a buffering agent. The presence of calcium carbonate also inhibits the formation of calcium digluconate and undesired acids which could affect the reaction.

The second step of the present method, a hydrogenation step carried out under conditions sufficiently alkaline to promote the isomerization of glucose may utilize a wide range of suitable conditions generally well known in the prior art. The processes described by Mueller in U.S. Patent 1,990,245 is an example of a prior art process in which a hydrogenation of sugar is carried out under alkaline conditions. A set of conditions found eminently suited to the second step of the present process, for example, is: a pH between about 8 and about 11, a temperature of between about 50 and about 80° C., and a hydrogen pressure of between about 500 and about 3000 p.s.i.g. applied for a time of between about 1.5 and about 6.0 hours. The product of the second hydrogenation generally contains less than about 2% residual sucrose or other non-reducing sugars and is particularly rich in mannitol.

If desired, a product containing less than 0.2% of non-reducing sugars may be obtained by lowering the pH of the product mixture of the second hydrogenation to a value of between about 4.5 and 6.5 by the additional of a suitable acid. Generally a pH less than about 4.5 is undesirable as a highly acidic feed material attacks the catalyst and the reaction equipment. A pH greater than 6.5 is usually not sufficiently acidic to hydrolyze the residual sucrose and fructose. Although acids such as sulfuric and hydrochloric are suitable, it is preferred that phosphoric acid be used as phosphoric acid is readily available and does not readily enter into side reactions which could interfere with the process.

The latter step, a hydrogenation step carried out under conditions sufficiently acidic to hydrolyze residual sucrose to glucose and fructose may utilize a wide range of suitable conditions generally well known in the prior art. The processes described by Power in U.S. Patent 2,280,975 and the process described by Kasehagen in U.S. Patent 2,968,680 are examples of prior art processes which relate to the hydrogenation of sugar under acidic conditions. A set of conditions found eminently suited to this step, for example, is: a pH less than 6.5, a temperature of from about 150 to 180° C., and a hydrogen pressure of between about 500 and about 3000 p.s.i.g. applied for a period of from about 0.25 to about 1 hour. The product of the latter hydrogenation step is a substantially pure mixture of mannitol and sorbitol, generally containing less than 0.2% by weight of non-reducing sugars.

The processes of the present invention may suitably be carried out by passing, concurrently, a slurry of saccharidic starting material containing a supported reduced nickel catalyst downward through a vertical reactor and simultaneously passing a supply of hydrogen gas under pressure upward through the reactor. The process may suitably be carried out in a plurality of reactors arranged in series.

The following examples illustrate more specifically the process of the present invention.

EXAMPLE 1

247 parts by weight of a neutral aqueous saccharidic solution containing 73% by weight of invert sugar was mixed, under a blanket of nitrogen gas, with 6.9 parts by weight of a diatomaceous earth supported nickel catalyst containing 20% by weight of nickel. The catalyst had a concentration-activity product of 2.1. The pH of the mixture was 7.0. The mixture was charged into an autoclave equipped with a stirrer and the autoclave purged with nitrogen and hydrogen. Hydrogen was introduced into the autoclave at room temperature to a pressure of 1500 p.s.i.g. The autoclave was then heated to 60° C. and held there for 1 hour. During this period, the pressure was maintained at 1500 ±50 p.s.i.g. During the latter part of the 1 hour period, the pressure within the autoclave stabilized. Such stabilization indicates substantially no further reaction of hydrogen and the autoclave product, in this case it indicated that substantially all the fructose was converted to mannitol and sorbitol. The pressure on the autoclave was then reduced and 0.9 part by weight of calcium oxide (0.5% based on the weight of sugar) in 20 ml. of distilled water was added. The pH of the solution was 8.5 measured at ambient conditions. The hydrogenation conditions were then restored and maintained for a period of 3.0 hours. During the latter part of the three hour period, the pressure within the autoclave stabilized. Such stabilization indicates substantially no further reaction of hydrogen and the autoclave product, in this case it indicated that substantially all the formed fructose was converted to mannitol and sorbitol. The pressure was then reduced and 5.5 parts by weight of a solution containing 17% by weight of phosphoric acid was added to the product in the autoclave, lowering the pH to 5.5 measured at ambient conditions. The hydrogenation conditions of pressure and temperature were again restored. The reaction temperature was increased over a 0.5 hour period to 160° C. and maintained at that temperature for a period of 1.0 hour. The pressure was then reduced, the autoclave allowed to cool to room temperature and the product was removed. The recovered product was analysed by column chromatography and found to contain 36.9% by weight mannitol, and 61.3% by weight sorbitol. The residual sugars are treated with an excess of cupric copper and the excess cupric ion determined iodometrically. The recovered product was found to contain 0.1% by weight of residual sugars.

EXAMPLE 2

The method of Example 1 was followed with the exception that the catalyst concentration was increased to 14 parts by weight instead of 6.9 parts by weight increasing the concentration-activity product to 4.1. The product analysed 33.2% mannitol, 64.5% sorbitol and 0.1% residual sugars.

EXAMPLE 3

The procedure of Example 2 was followed with the exception that the hydrogen pressure during the initial hydrogenation process was maintained at 500 p.s.i.g. instead of 1500 p.s.i.g. and the acid hydrogenation period was conducted at 160° C. for a period of 0.5 hour. The product analysed 36.1 mannitol, 65.6 sorbitol, 0.15 reducing sugar and 0.12 non-reducing sugar.

EXAMPLE 4

The procedure of Example 2 was followed with the exception that the alkaline hydrogenation period was conducted at 60° C. for 1.5 hours and the acid hydrogenation period was conducted at 160° C. for a period of 0.5 hour. The product analysed 29.5% mannitol, 68.2 sorbitol and 0.23% residual sugar.

EXAMPLE 5

247 parts by weight of a neutral aqueous saccharidic solution containing 73% by weight of invert sugar was mixed, under a blanket of nitrogen gas, with 4.0 parts by weight of a carbon supported ruthenium catalyst containing 5% by weight ruthenium. The concentration-activity product was 2.7. The pH of the mixture was 7.0. The mixture was than hydrogenated in accord with the method described in Example 1 above except, the second, alkaline, hydrogenation was carried out over a time period of 4.0 hours, and the third, acidic, hydrogenation was carried out over a time period of 0.25 hour. The recovered product was analysed and found to contain 36.0% by weight of mannitol, 55.4% by weight of sorbitol, and about 0.1% by weight residual sugars.

We claim:

1. A process of producing mannitol and sorbitol from an aqueous mixture of glucose and fructose which comprises
    adjusting an aqueous mixture containing glucose and fructose to a pH of substantially neutral,
    hydrogenating said mixture, under hydrogenation conditions and in the presence of a hydrogenation catalyst at a temperature between about 50° and about 80° C., until substantially all the fructose is converted to sorbitol and mannitol,
    adding an alkaline agent to said mixture to raise the pH to a value of between 8.0 and about 11.0,
    hydrogenating said mixture, under hydrogenation conditions and in the presence of a hydrogenation catalyst at a temperature between about 50° and about 80° C., until substantially all of the reducible sugars are hydrogenated,
    adding sufficient acid to said last reaction product to lower the pH to a value of below 6.0, and
    hydrogenating said mixture, under hydrogenation conditions and in the presence of a hydrogenation catalyst at a temperature between about 150° and about 180° C., until substantially all of the formed reducible sugars are hydrogenated.

2. A process of producing mannitol and sorbitol from an aqueous mixture of glucose, fructose and sucrose which comprises
    adjusting the pH of an aqueous saccharidic mixture of fructose and glucose to a value of from about 6.0 to 8.0,
    hydrogenating said mixture, under hydrogenation conditions and in the presence of a hydrogenation catalyst at a temperature between about 50° and about 80° C., until substantially all the fructose is converted to sorbitol and mannitol,
    adding an alkaline agent to said mixture to raise the pH to a value of between 8.0 and about 11.0,
    hydrogenating said mixture, under hydrogenation conditions and in the presence of a hydrogenation catalyst at a temperature between about 50° and about 80° C., until substantially all of the reducible sugars are hydrogenated,
    adding acid to said later reaction product to lower the pH to a value below 6.0, and
    hydrogenating said mixture, under hydrogenation conditions and in the presence of a hydrogenation catalyst at a temperature between about 150° and about 180° C., until substantially all of the reducible sugars are hydrogenated.

3. A process of producing mannitol and sorbitol from an aqueous mixture of fructose, glucose and sucrose which comprises
    adjusting the pH of an aqueous saccharidic mixture containing a total of from about 25 to about 80% by weight of fructose and glucose to a value of from about 6.0 to 8.0,
    suspending therein a hydrogenation catalyst having a concentration-activity product of between about 0.9 and 6.0,
    hydrogenating the mixture by contacting the mixture and suspended catalyst with hydrogen gas under a pressure of from about 500 to about 3000 pounds per square inch gauge
    at a temperature of between about 50 and about 80° C., continuing the hydrogenation for a period of between 0.25 and about 2 hours,
    introducing into the reaction mixture from about 0.25 to about 1.5% by weight of lime based on the weight of saccharidic solids in the initial starting mixture, hydrogenating the resultant mixture by contacting the mixture with hydrogen gas under a pressure of from about 500 to about 3000 pounds per square inch gauge at a temperature of between about 50 and about 80° C., continuing the second hydrogenation for a period of between about 1.5 and about 3.0 hours, introducing a sufficient amount of mineral acid to the last hydrogenated mixture to obtain a mixture having a pH of less than about 6.0 to hydrolyze any sucrose present, and hydrogenating the acidified mixture by contacting the mixture with hydrogen at a pressure of from about 500 to about 3000 pounds per square inch gauge, at a temperature of between about 150 and about 180° C., until substantially all of the formed reducible sugars are hydrogenated.

References Cited

UNITED STATES PATENTS

| | | | |
|---|---|---|---|
| 1,990,245 | 2/1935 | Mueller et al. | 260—635 |
| 2,280,975 | 4/1942 | Power | 260—635 |
| 2,292,293 | 8/1942 | Rose | 260—635 |
| 2,642,462 | 6/1953 | Kasehagen | 260—635 |
| 2,749,371 | 6/1956 | Kasehagen | 260—635 |
| 2,968,680 | 1/1961 | Kasehagen | 260—635 |

FOREIGN PATENTS 522,729  6/1940  Great Britain.

LEON ZITVER, *Primary Examiner.*

M. B. ROBERTO, G. A. MILWICK, J. E. EVANS, *Assistant Examiners.*